(12) United States Patent
Papin et al.

(10) Patent No.: US 10,392,955 B2
(45) Date of Patent: Aug. 27, 2019

(54) TURBOMACHINE FAN FRAME COMPRISING IMPROVED ATTACHMENT MEANS

(71) Applicant: SAFRAN AIRCRAFT ENGINES, Paris (FR)

(72) Inventors: Thierry Georges Paul Papin, Varennes-Jarcy (FR); Kaelig Merwen Orieux, Fontaine le Port (FR); Virginie Guilbert, Boissise le Roi (FR); Lise Lacroix, Blandy-les-Tours (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 368 days.

(21) Appl. No.: 15/225,990

(22) Filed: Aug. 2, 2016

(65) Prior Publication Data

US 2017/0037871 A1 Feb. 9, 2017

(30) Foreign Application Priority Data

Aug. 3, 2015 (FR) ..................................... 15 57485

(51) Int. Cl.
*F01D 9/04* (2006.01)
*F01D 11/00* (2006.01)
*F04D 29/52* (2006.01)

(52) U.S. Cl.
CPC ............ *F01D 11/008* (2013.01); *F01D 9/042* (2013.01); *F04D 29/522* (2013.01);
(Continued)

(58) Field of Classification Search
CPC ..... F01D 11/008; F04D 29/522; F04D 29/542
See application file for complete search history.

(56) References Cited

U.S. PATENT DOCUMENTS 5,540,552 A * 7/1996 Surdi .................... F01D 5/3007
416/220 R
6,145,300 A * 11/2000 Romani ................. F01D 5/141
415/199.4
(Continued)

FOREIGN PATENT DOCUMENTS

EP 1 972 575 A1 9/2008
FR 2 988 427 A1 9/2013
(Continued)

OTHER PUBLICATIONS

Search Report dated Oct. 24, 2016 in United Kingdom Patent Application No. GB1613406.6.
(Continued)

*Primary Examiner* — Woody A Lee, Jr.
(74) *Attorney, Agent, or Firm* — Oblon, McClelland, Maier & Neustadt, L.L.P.

(57) ABSTRACT

A turbomachine fan frame including a central hub, a plurality of radial vanes installed on the hub and distributed around the hub, each vane including an inner radial end root at which the vane is fixed to the hub, a plurality of flow stream reconstitution platforms, each platform being installed between the roots of two adjacent vanes and radially at a distance from the hub, wherein each platform is fixed to the hub by at least one support element associated with the platform, the support element located between the associated platform and the hub and located between the roots of two adjacent vanes.

10 Claims, 2 Drawing Sheets

(52) U.S. Cl.
CPC ...... *F05D 2240/80* (2013.01); *F05D 2260/31* (2013.01); *Y02T 50/671* (2013.01)

(56) References Cited

U.S. PATENT DOCUMENTS

| | | | | |
|---|---|---|---|---|
| 6,447,250 | B1* | 9/2002 | Corrigan | F01D 5/3007 416/193 A |
| 6,726,452 | B2* | 4/2004 | Strassberger | F01D 5/3007 416/190 |
| 7,407,368 | B2* | 8/2008 | Tanaka | F01D 9/04 415/173.1 |
| 7,918,652 | B2* | 4/2011 | Fujimura | F01D 5/3015 416/219 R |
| 7,950,899 | B2* | 5/2011 | Euvino, Jr. | F01D 5/147 415/200 |
| 8,215,910 | B2* | 7/2012 | Belmonte | B64C 11/14 416/144 |
| 8,297,931 | B2* | 10/2012 | Read | F01D 11/008 416/215 |
| 8,438,832 | B1* | 5/2013 | Brilliant | F01D 5/141 60/226.1 |
| 8,529,204 | B2* | 9/2013 | Bagnall | F01D 5/066 415/218.1 |
| 9,739,162 | B2* | 8/2017 | Bottome | F01D 11/008 |
| 9,752,449 | B2* | 9/2017 | Bottome | F01D 11/008 |
| 2008/0232969 | A1 | 9/2008 | Brault et al. | |
| 2010/0290910 | A1* | 11/2010 | Hoyland | F01D 11/008 416/193 R |
| 2011/0038731 | A1* | 2/2011 | Evans | F01D 5/06 416/220 R |
| 2011/0146299 | A1* | 6/2011 | Hoyland | F01D 11/006 60/797 |
| 2014/0186187 | A1 | 7/2014 | Lamboy et al. | |
| 2014/0227088 | A1* | 8/2014 | Beaujard | F01D 5/282 415/173.4 |
| 2014/0286781 | A1* | 9/2014 | Billings | F01D 5/3007 416/219 R |

FOREIGN PATENT DOCUMENTS

| | | |
|---|---|---|
| WO | WO 2011/128551 A2 | 10/2011 |
| WO | WO 2014/088673 A2 | 6/2014 |
| WO | WO 2014/149366 A1 | 9/2014 |
| WO | WO 2014/197105 A2 | 12/2014 |

OTHER PUBLICATIONS

French Preliminary Search Report dated May 31, 2016 in French Application 15 57485, filed on Aug. 3, 2015 ( with English Translation of categories of Cited Documents).

* cited by examiner

TURBOMACHINE FAN FRAME COMPRISING IMPROVED ATTACHMENT MEANS

TECHNICAL DOMAIN

The invention relates to a turbomachine fan frame, that comprises a fan guide vanes wheel and improved means for the support and installation of air flow stream reconstitution platforms.

STATE OF PRIOR ART

A turbomachine fan frame generally comprises a central hub that is coaxial with the principal axis of the turbomachine, a plurality of radial vanes mounted on the hub and distributed around it to form a fan guide vanes wheel, and air flow reconstitution platforms installed between vane roots.

These platforms radially cover vane roots to form a smooth surface along which the airflow circulating in the flow stream circulates.

According to one known embodiment, it has been proposed that platforms should be integrated into the metallic structure of the vanes. In particular, this can reduce the number of parts to be assembled in the turbomachine.

However, if the platform were damaged, the entire vane would have to be replaced, which increases the maintenance cost of the turbomachine.

It has also been proposed that platforms can be made in the form of add-on elements mounted on vane roots.

Such platforms can be replaced independently of the vanes, thus limiting the costs of the work.

Each platform is fixed to vane roots that are fitted with nuts as inserts in the vane roots. Such inserts increase the complexity and weight of each vane.

Furthermore, the wall of each platform that is in contact with the gas flow is at a radial distance from vane roots. To obtain such a distance, it has been proposed to include positioning ribs and studs in the platform to increase the general thickness of the platform.

Such a solution implies that the overall mass of the platform, and consequently its cost, are high.

The purpose of the invention is to disclose a turbomachine fan frame comprising improved means of installing platforms to form the gas flow stream, to reduce the overall mass and the cost of the fan frame.

PRESENTATION OF THE INVENTION

The invention relates to a turbomachine fan frame comprising:
  a central hub,
  a plurality of radial vanes installed on the hub and distributed around the hub, each vane comprising an inner radial end root at which the vane is fixed to the hub,
  a plurality of flow stream reconstitution platforms, each platform being installed between the roots of two adjacent vanes and radially at a distance from the hub,
  characterised in that each platform is fixed to the hub by at least one support element associated with said platform, said support element being located between the associated platform and the hub and being located between the roots of two adjacent vanes.

Support elements form intermediate components between the vanes and the platforms, which simplifies the structure of both the platforms and the vane roots.

Support elements with low mass can also be made. Thus, the total mass of the fan frame is reduced due to the association with a simplified structure and lower platform mass.

Each support element is preferably fixed directly to the hub.

Each support element is preferably fixed to the hub at each of the roots between which it is mounted.

Each support element is preferably fixed to the hub and the associated roots by means of the screws fastening each root to the hub.

The invention thus also relates to a support element for a fan frame made from a single piece by bending and/or folding a strip of sheet metal.

Preferably, it comprises two cleats for attachment of the support element on the hub that are located in a first plane parallel to the main axis of the hub, and it comprises a plate located in a second approximately parallel plane offset radially outwards from said first plane, on which the associated platform will be mounted.

Preferably, the general shape of the plate is elongated and each end of the plate is connected to an attachment cleat through an inclined arm.

Preferably, the plate comprises positioning orifices and/or orifices for attachment of a platform onto the support element.

Preferably, the plate is fitted with a nut that will cooperate with a screw for attachment of a platform onto the support element.

The invention also relates to an aircraft turbomachine comprising a fan frame according to the invention in which at least one support element according to the invention is installed between the roots of two adjacent vanes.

BRIEF DESCRIPTION OF THE DRAWINGS

Other characteristics and advantages of the invention will become clear after reading the detailed description given below which will be understood more easily with reference to the appended figures.

DETAILED PRESENTATION OF PREFERRED EMBODIMENTS

Figure 1:
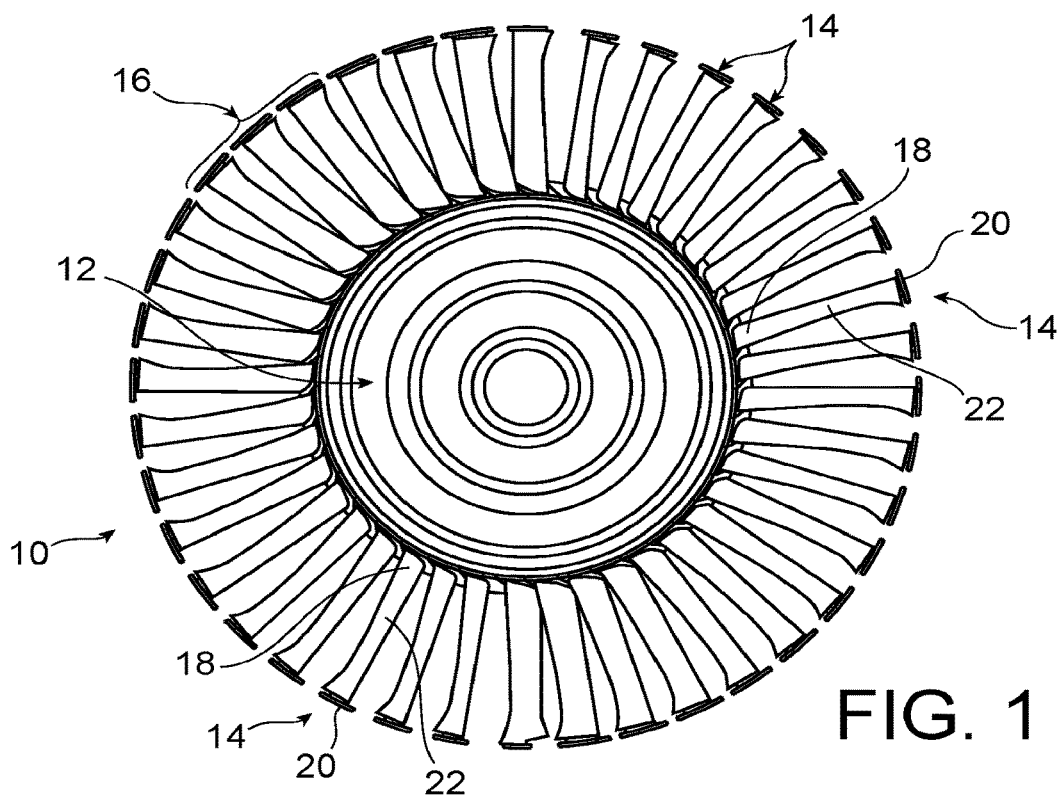
FIG. 1 is a diagrammatic view of a fan frame of an aircraft turbomachine.

FIG. 1 shows a fan frame 10 of an aircraft turbomachine comprising an outer wheel (not shown) a central hub 12 coaxial with a principal axis of the turbomachine rotors (not shown) radial arms and a plurality of vanes 14 forming guide vanes distributed around its principal axis thus forming a fan guide vanes wheel 16.

The outer wheel and the central hub form structured elements of the frame 10.

Each vane 14 comprises a root 18 at the radial inner end, a head 20 at the external radial end and a central body 22.

Each vane 14 is fixed to the hub 12 at its root 18 and is fixed to the external shell by its head 20. The body 22 of each vane 14 is shaped to direct the air flow circulating through the fan frame 10.

Figure 2:
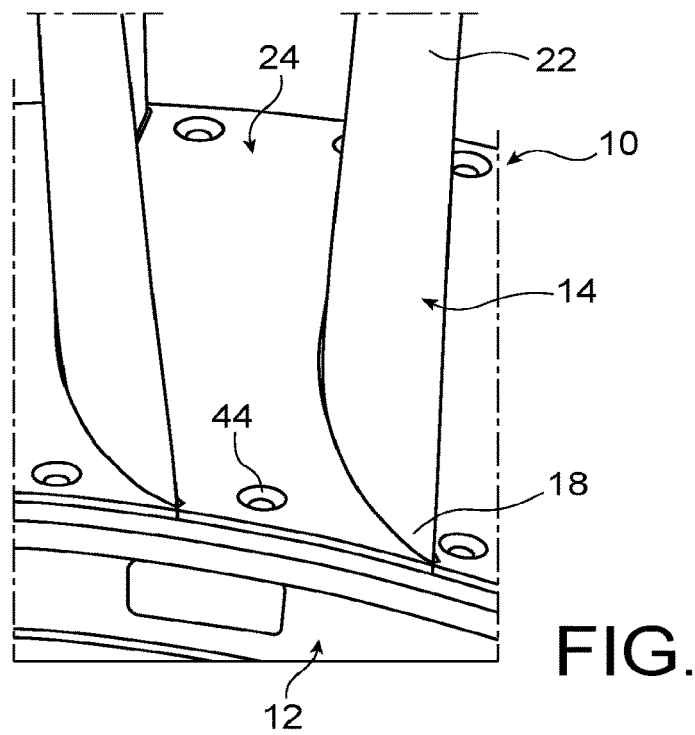
FIG. 2 is a perspective detailed view of the fan frame shown in FIG. 1, showing air flow stream reconstitution platforms.

As can be seen in more detail on FIG. 2, the fan frame 10 also comprises platforms 24 arranged between the roots 18 of two adjacent vanes 14.

The set of these platforms 24 delimits the radially inner part of an annular air flow circulation stream through the fan frame 10. The outer part of the air flow stream is delimited by the outer shell (not shown) fixed to the heads 20 of the vanes 14.

In this case, a single platform 24 is located between the roots 18 of two adjacent vanes 14.

Each platform 24 is fixed to the hub 12 and is located radially at a given distance from the outer peripheral edge of the hub 12. This attachment is preferably made by screwing.

Figure 3:
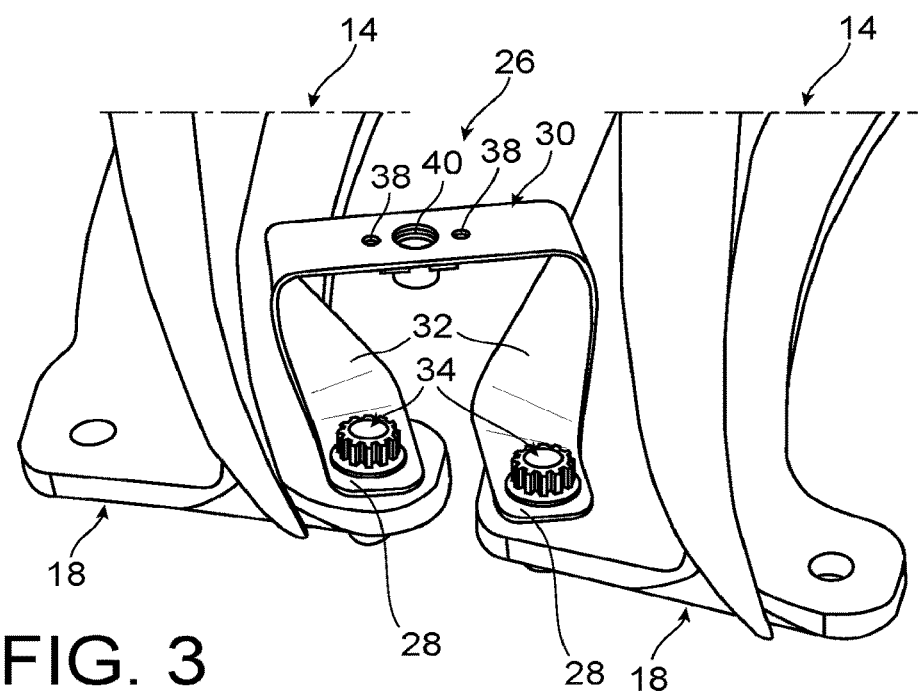
FIG. 3 is a view similar to the view shown in FIG. 2, showing a support element in place in the fan frame.
Figure 4:
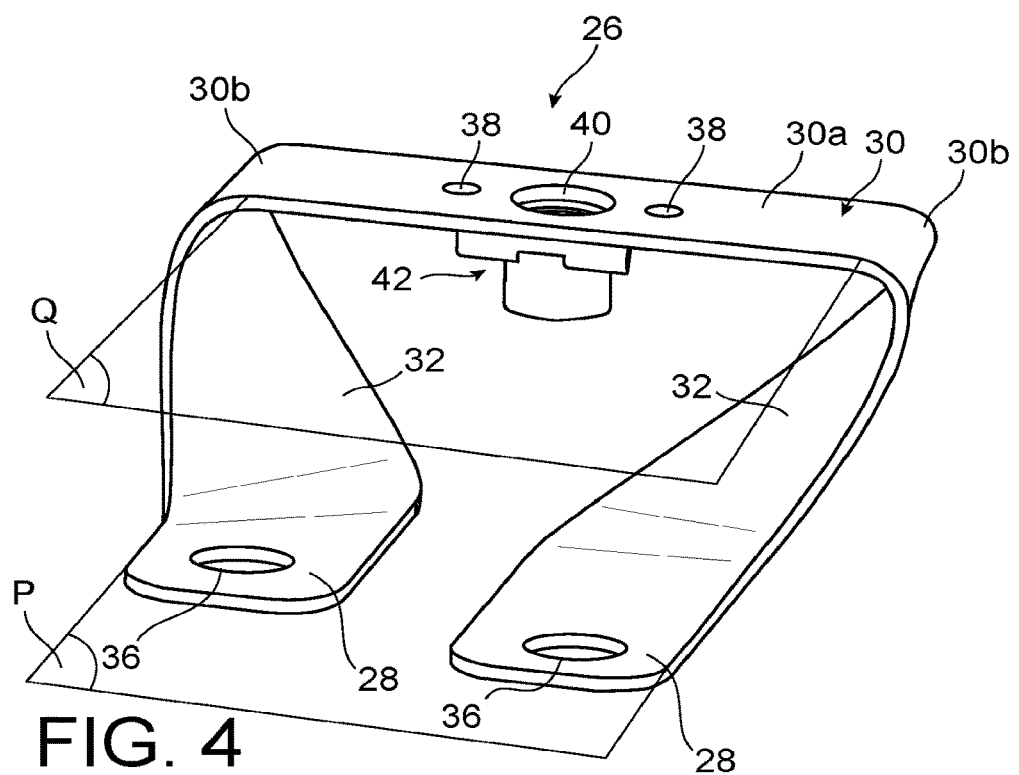
FIG. 4 shows a perspective view of the support element shown in FIG. 3.

FIGS. 3 and 4 show a support element 26 on which a platform 24 will be fitted and through which the platform 24 is mounted on the hub 12.

In this case, a single support element 26 is shown on FIG. 3. It will be understood that the invention is not limited to the use of a single support element 26 for the installation of each platform 24.

Thus, and according to a preferred embodiment, the fan frame 10 comprises two support elements 26 installed between each platform 24 and the hub 12. These two support element 26 are axially offset along the principal axis of the hub and therefore along the air flow direction through the fan frame 10.

The structures of these two support elements 26 are identical or similar, the only differences between them are their dimensions and orientations.

As can be seen in more detail on FIG. 4, each support element 26 comprises two cleats 28 through which the support element 26 is fixed to the hub 12, a plate 30 that is offset radially outwards relative to the cleats 28, on which the platform will be mounted, and two inclined arms 32 connecting each cleat to the plate 30.

According to one preferred embodiment shown on the figures, each support element 26 is made in a single piece by folding and bending a metal strip. For example, the support element is made from a metal strip based on steel, aluminium or titanium.

According to the embodiment shown in FIG. 3, the support element 26 is fixed to the hub 12 through the roots 18 of the vanes 14, in other words the roots are located between the cleats 28 and the hub 12 (not shown on FIG. 3).

Preferably, each cleat 28 is associated with a root 18 of a vane and is fixed to the associated root 18 and to the hub 12 by screws 34 fastening the root 18 to the hub. Each cleat 28 comprises an orifice 36 for this purpose for the passage of the associated screw 34.

The cleat 28 forms a bearing element for the screw head, like a washer. Therefore there is no additional washer for bearing of the head of the associated screw 34, nor are there any additional means for attachment of the support element 26.

According to one variant embodiment not shown, the support element 26 is fixed directly to the hub 12 by attachment means separate from the means of attachment of the roots 18 to the vanes 14.

The two cleats 28 are approximately in the same plane P oriented principally perpendicular to a radial direction.

The general shape of the plate 30 is elongated and it extends in a second plane Q approximately parallel to the first plane P defined above, that is associated with the cleats 28, this second plane Q is offset radially from the plane P associated with the cleats 28.

The plate 30 in this case is approximately plane, therefore it has a radially outer bearing face 30a on which the associated platform 24 bears.

The plate 30 also comprises means for positioning and fixing the platform 24, that in this case consist of fastening by screwing.

The plate 30 is provided with orifices 38 for this purpose that are designed to cooperate with complementary pins (not shown) on the platform 24 for positioning the platform 24 relative to the plate 30 and an orifice 40 associated with a captive nut 42 into which an attachment rod (not shown) is fitted.

The arms 32 make the connection between the cleats 28 and each end 30b of the plate 30. They are bent as a function of the offset between the plane P associated with the cleats 28 and the plane Q associated with the plate 30.

The fan frame 10 has vanes with different shapes and/or dimensions. In general, the fan frame has a number of vane shapes called "part numbers". The shape of each vane is one of these predefined shapes.

However, the shape of the support elements 26 is independent of the shape of the vanes 14. Thus, all support elements 26 provided at a particular axial position are identical, which reduces the number of different components and consequently reduces manufacturing costs of the fan frame 10.

The structure of support elements 26 simplifies their installation and the installation of platforms 24 on the hub 12, and removal of a platform 24 independently of removal of a vane 14.

According to an alternative embodiment not shown, the fan frame 10 also comprises platforms installed between the heads 20 of two adjacent vanes 14 to delimit the radially outer part of the annular air flow stream. These platforms are fixed to the outer wheel being radially at a distance from the outer wheel.

In this alternative embodiment, each platform is fixed to the outer wheel in a similar way as a platform 24 which is fixed to the hub 12 of the fan frame 10, i.e. by means of one or several support element 26.

The description of the support elements 26 for the platforms 24 associated with the roots 18 of the vanes 14 will apply by similarity to the description of the support elements 26 for the platforms associated with the heads 20 of the vanes 14, as these support elements are similar.

It will be understood that the invention can concern a fan frame 10 comprising flow stream reconstitution platforms that are fixed to one and/or the other of the two structural elements of the fan frame 10 that are the outer wheel and the central hub 12 by support elements 26 as described before, i.e. either to the outer wheel, to the central hub 12 or to both the outer wheel and the central hub 12.

The invention claimed is:

1. A turbomachine fan frame comprising:
   a central hub, and an outer wheel forming structural elements of the fan frame;
   a plurality of radial vanes installed on the hub and on the wheel that are distributed around the hub, each vane comprising a radial end at which the vane is fixed to one of the structural elements;
   a plurality of flow stream reconstitution platforms, each platform being installed between the radial ends of two adjacent vanes and radially at a distance from said structural element to which the platform is fixed; and
   a support element associated with each platform that is located between the associated platform and the structural element and that is arranged between said radial ends of the two adjacent vanes, wherein the support element comprises first and second cleats for attachment of the support element onto the structural element, the first and second cleats each including an attachment surface located in a first plane which is perpendicular to a radial direction, and a plate located in a second plane parallel to and offset from said first plane in the radial direction on which the associated platform will be mounted.

2. A turbomachine fan frame comprising:

a central hub;

a plurality of radial vanes installed on the hub and distributed around the hub, each vane comprising an inner radial end root at which the vane is fixed to the hub;

a plurality of flow stream reconstitution platforms, each platform being installed between the roots of two adjacent vanes and radially at a distance from the hub; and a support element associated with each platform that is located between the associated platform and the hub and that is arranged between the roots of two adjacent vanes, wherein the support element comprises first and second cleats for attachment of the support element onto the hub, the first and second cleats each including an attachment surface located in a first plane parallel which is perpendicular to a radial direction, and a plate located in a second plane parallel to and offset from said first plane in the radial direction on which the associated platform will be mounted.

3. The fan frame according to claim 1, wherein each support element is fixed directly to the structural element.

4. The fan frame according to claim 1, further comprising a plurality of support elements, wherein each support element is fixed to the structural element at each of the radial ends between which the support element is mounted.

5. The fan frame according to claim 3, wherein the support element is fixed to the structural element and the radial ends of the two adjacent vanes with screws fastening each root to the structural element.

6. The fan frame according to claim 3, wherein the plurality of platforms is installed between outer radial ends of the vanes and being radially at a distance from the outer wheel.

7. An aircraft turbomachine comprising the turbomachine fan frame according to claim 1, wherein the support element is installed between roots of the two adjacent vanes.

8. A support element for a fan frame comprising:

first and second cleats for attachment of the support element onto a structural element of the fan frame, the first and second cleats each including an attachment surface located in a first plane which is horizontal; and a plate located in a second plane parallel to and offset from the first plane in a radial direction on which an associated platform will be mounted, wherein said support element is made from a single piece by at least one of bending or folding a strip of sheet metal; and wherein the plate is fitted with a nut that will cooperate with a screw for attachment of the associated platform onto the support element.

9. The support element according to claim 8, wherein the general shape of the plate is elongated and each end of the plate is connected to one of the first or second cleats through an inclined arm.

10. The support element according to claim 8, wherein the plate comprises at least one of positioning orifices or orifices for attachment of the associated platform onto the support element.

* * * * *